Sept. 1, 1925.  
E. BUGATTI  
1,551,798  
ELASTIC AXLE FOR MOTOR VEHICLES  
Filed Oct. 5, 1923  
2 Sheets-Sheet 1
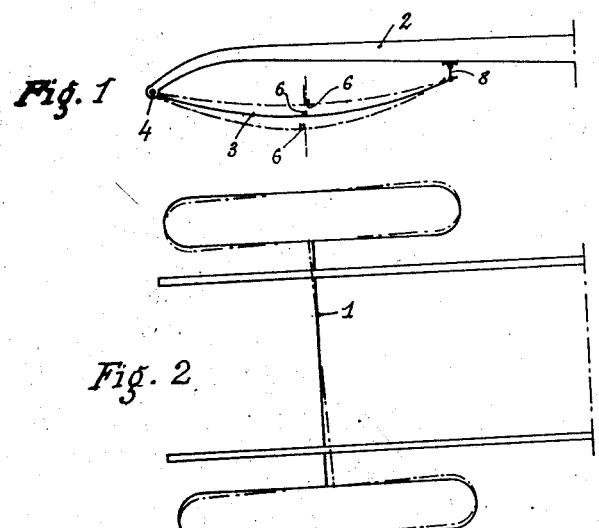
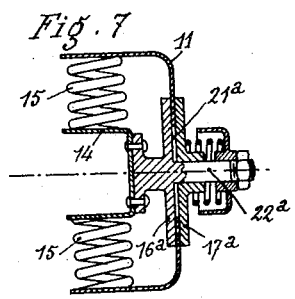
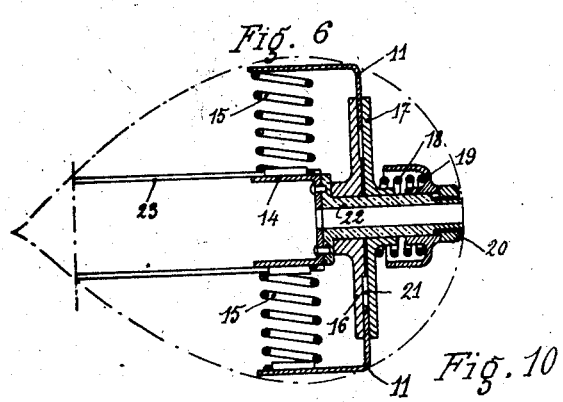
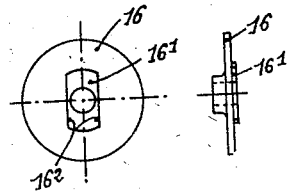
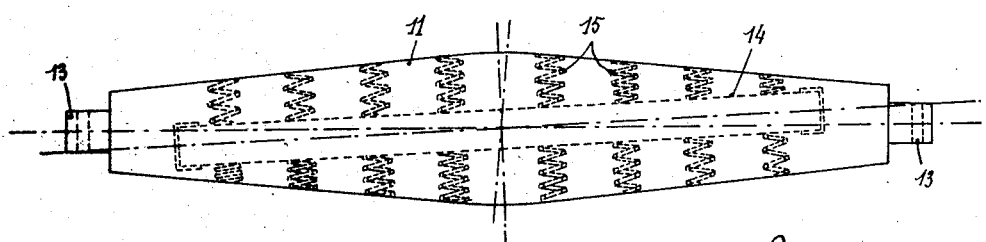
Inventor.
Ettore Bugatti,
By ———— Atty.

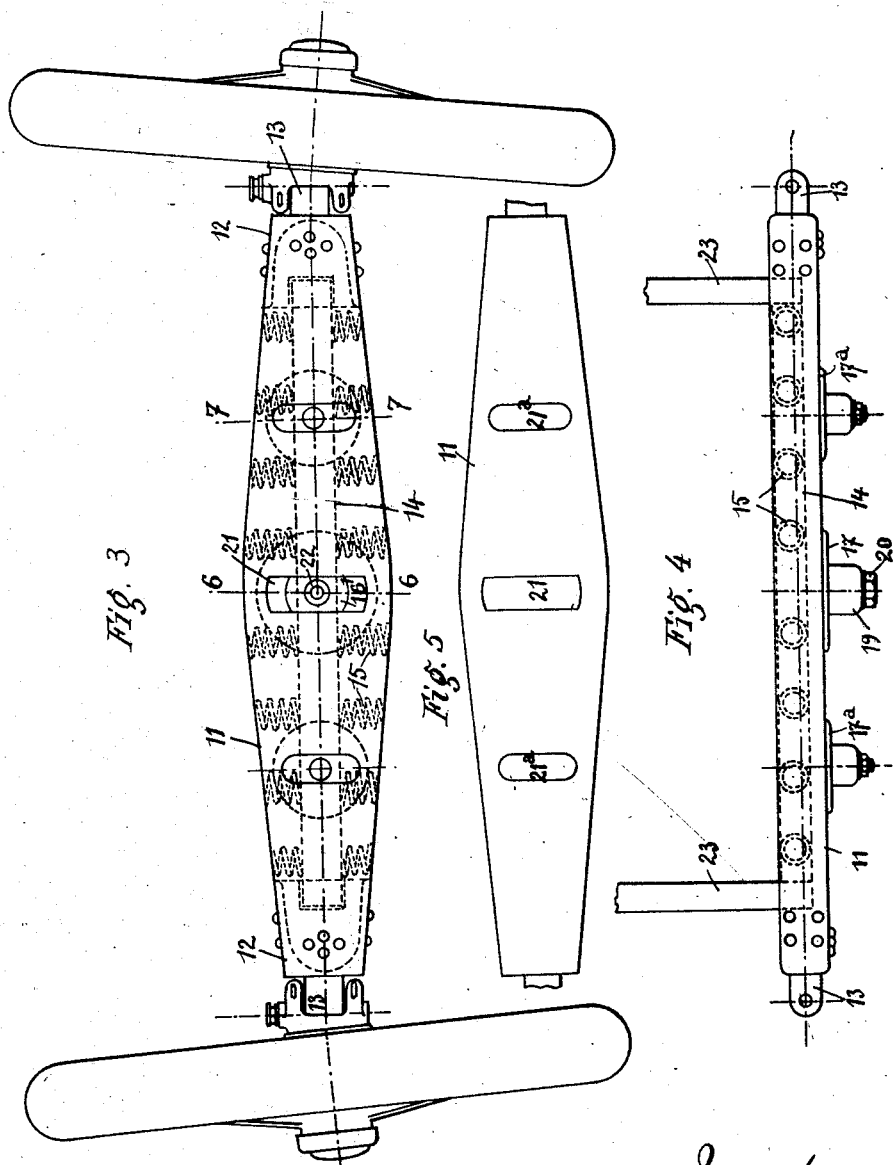

Patented Sept. 1, 1925.

1,551,798

UNITED STATES PATENT OFFICE.

ETTORE BUGATTI, OF MOLSHEIM, FRANCE.

ELASTIC AXLE FOR MOTOR VEHICLES.

Application filed October 5, 1923. Serial No. 666,768.

*To all whom it may concern:*

Be it known that I, ETTORE BUGATTI, a subject of the King of Italy, and a resident of Molsheim, Bas-Rhin Department, France, have invented certain new and useful Improvements in Elastic Axles for Motor Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Vehicle axles of the known types consist as a general rule of forged pieces which are secured to the vehicle frame by semi-elliptical springs or ¼ elliptical springs.

This arrangement offers a drawback from the fact that the deformations of the spring due to the inequalities of the road will produce displacements of the axle in the horizontal plane, and this may cause much prejudice to the steering gear.

Further, the breakage of a main spring plate is always to be apprehended, and this may produce fatal accidents.

My invention relates to an axle combination whereby such drawbacks may be eliminated, and the irregularities of the road can no longer affect the position of the front axle in its horizontal plane, whilst the axle is free to move in the vertical plane.

In this invention, the axle consists essentially of a U-shaped element wherein is disposed the front cross-piece of the vehicle frame; between the flanges of said cross-piece and those of the axle are disposed along the whole length of the axle, and above and below, a certain number of spiral springs which serve the purpose of the usual plate springs.

A suitable guiding device further connects the middle part of the axle with said cross-piece, so that all transverse displacement or play of the axle with respect to the vehicle frame will be prevented.

Shock-absorbers can also be provided for the braking of the motion of the axle relative to the cross-piece, the said shock-absorbers consisting for example of discs having between them the vertical web of the axle, said discs being pressed by means of a device with adjustable pressure such as a spiral spring.

The present invention further relates to the following improvements in the said axle arrangements:

*a.*—The front cross-piece of the vehicle frame has a U-shape and partially surrounds the axle, according to an arrangement which is the inverse of the one above indicated.

*b.*—The axle is guided in its movement by means of bosses movable in vertical slots in the said cross-piece, the said bosses being secured to cheeks assembled by an axle or spindle extending through the vehicle axle and having the latter pivoted thereon.

*c.*—One or more plate springs or undulated springs are interposed between the said cross-piece and the vehicle axle.

*d.*—The application to the rear axle of the vehicle of an arrangement analogous to what is employed for the front axle.

*e.*—The devices for damping the motion of the axle consist of the cheeks referred to in paragraph (*b*), the friction surfaces of the damping device being formed by the internal faces of the cheeks, the internal and external faces of both walls of the cross-piece, and the front and rear faces of the vehicle axle.

The following description and appended drawings which are given by way of example set forth the present invention.

Figs. 1 and 2 are diagrams, respectively in elevation and plan, relative to the known arrangements.

Fig. 3 is a front elevation of a front axle according to the invention, with certain parts removed.

Fig. 4 is a plan view of the same, with the wheels removed.

Fig. 5 is a front view of the axle alone.

Fig. 6 is a transverse section on the line 6—6 of Fig. 3.

Fig. 7 is a section on the line 7—7 of Fig. 3.

Figs. 8 and 9 are detail views.

Fig. 10 is a view analogous to Fig. 3 showing the relative position of the axle and the cross-piece after a deformation due to a shock.

In the known suspension arrangements disposed at the front of the vehicle, the axle 1 is connected with the vehicle frame 2, Figs. 1 and 2, by means of semi-elliptical springs 3 whereof one end is secured to the vehicle frame at 4 and the other is attached to a shackle 8.

When the right and left hand springs 3 are subjected to deformation under the effect of a temporary overload or discharge of load due to the inequalities of the road, the points 6 at which the springs are attached to the axle will each be displaced on an arc of a circle having the point 4 as a centre, Fig. 1, the point 6 being moved forward when the spring is released and moved backward when it is bent.

In these conditions, if it be supposed that the left hand wheel is raised and the right hand wheel lowered, the point at which the axle is attached to the left hand spring will be moved backward and the corresponding point for the right hand spring will be moved forward, so that the axle 1 will assume the position shown in the mixed lines, Fig. 2, in which the wheels are slightly turned towards the left.

These changes in the shape of the spring will thus tend to turn the vehicle about, so that an effort must be constantly exerted upon the steering gear in order to follow a straight line; this drawback is but little apparent at slow speeds, but it becomes a source of great danger at high speeds, and the driver must be in constant movement for this reason, and further, the drawback cannot be obviated even by the use of the most powerful shock-absorbers.

In my invention, the vehicle axle consists essentially of a sheet metal element 11 having a general U-shape in transverse section and the form of a solid of uniform strength in the lengthwise direction; to each end of said axle are riveted the forged pieces 12 which are adapted to receive the journal 13 and the trunnions.

Within the said axle is disposed the front frame cross-piece 14 secured to the ends of the longitudinals 23, and the spiral springs 15 are disposed between the said cross-piece and the axle, above and below the cross-piece.

It is to be observed that the oscillations of the front axle occasioned by the inequalities of the ground will take place in the original vertical plane of the axle; if it be supposed that the left hand wheel is raised, Fig. 10, whilst the right hand wheel is lowered (designating by right and left hand the wheels respectively at the right and left hand of the driver) the lower end springs on the right and the upper end springs on the left will be compressed, as observed, thus producing a resistance couple which tends to restore the spring to the normal position of equilibrium.

In the case in which both wheels are raised at the same time, all the lower springs will be expanded and all the upper springs compressed, and this will also tend to bring the axle into the original position.

As shown in Figs. 3, 6 and 7, in order that the axle may move in a vertical or angular manner with respect to the vehicle frame, whilst all lateral displacement is prevented, suitable guiding means are used to connect the middle of the axle with the middle of the front cross-piece, and said means may have the following construction.

To the cross-piece 14 is riveted a sleeve 22 (into which can be inserted the axle of the engine-starting handle) and which has revoluble thereon the disc 16 which bears upon the rear face of the axle 11; a second disc 17 bears upon the other face of the said axle, and is pressed thereupon by a regulating spring 18 which is covered by a cap 19 and is held by a nut 20.

As shown in Figs. 8 and 9, the disc 16 has at the middle an oblong projecting portion $16_1$, having the parallel faces $16_2$ and fitting into a slot of like form 21 provided in the vertical cheek of the axle 11 and slidable in the latter, Fig. 3. The projecting portion 16, prevents all lateral displacement or play of the said axle, but the latter is enabled to move in the vertical direction due to the slidable arrangement, as well as in the angular direction, Fig. 10, in which case the disc 16 turns upon the sleeve 22. The aggregate of the discs 16 and 17 also constitutes a central shock absorber of the friction type by reason of the pressure of the discs, thus braking the movements of the axle with respect to the cross-piece.

At each side of the central shock-absorber may be disposed one or more lateral shock-absorbers of analogous construction, whereof one is shown in Fig. 7, comprising as before the two discs $16^a$, $17^a$ having between them the cheek of the axle, but the disc $16^a$ does not serve as a guiding member, and hence it can be riveted to the cross-piece 14, the axle $22^a$ extending loosely, with a certain play, through an aperture $21^a$ of the cheek of the said vehicle axle, so as to provide for the angular motion of the latter The principal advantages of the axle arrangement according to the invention are as follows:

1. Elimination of jarring transmitted to the steering gear by the rearward displacements of the front vehicle axle which in my invention can only move in a vertical plane.

2. The weight of the whole axle device is much reduced.

3. All danger of accident from the breakage of a main spring plate is eliminated.

4. The said axle piece can be manufactured by the rolling process with facility.

5. The shock absorbers can be mounted without drilling the vehicle frame for this purpose, and all weakening of the longitudinals is thus avoided.

Obviously, the arrangements hereinbefore described by way of example are not limitative, and are subject to modifications without departing from the principle of the invention.

In particular, the said main axle may have a profiled shape and may be disposed in a casing whose outline is shown in the broken lines, Fig. 6, and this will be advantageous for racing vehicles.

What I claim is:—

1. The combination with a vehicle frame having an end cross piece; of a profiled U-shaped member in which said piece is inclosed, wheel mounting means rigidly secured to the end of said member beyond the ends of said piece, means to yieldingly support the member on said piece and means to constrain said member to move vertically with respect to said piece.

2. The combination with a vehicle frame having an end cross piece; of a profiled U-shaped member in which said piece is inclosed, wheel mounting means rigidly secured to the end of said member beyond the ends of said piece, means to yieldingly support the member on said piece, means to constrain said member to move vertically with respect to said piece and means secured to said piece to damp the vertical movements of the member.

3. An axle for motor vehicles consisting of a profiled member of U or like shape wholly or partially surrounding the cross-piece of the vehicle frame and forming the axle properly so called, an elastic device interposed between the said cross-piece and the vehicle axle above and below the said cross-piece, a spindle secured to the middle of the cross-piece of the vehicle frame and extending in the longitudinal direction of the vehicle, a disc revoluble upon said spindle, a boss provided upon said disc which engages in a slot formed in the main body of the said axle and is slidable therein.

4. An axle for motor vehicles consisting of a profiled member of U or like shape wholly or partially surrounding the cross piece of the vehicle frame and forming the axle properly so called, an elastic device interposed between the said cross-piece and the vehicle axle above and below the said cross-piece, a spindle secured to the middle of the cross-piece of the vehicle frame and extending in the longitudinal direction of the vehicle, a disc revoluble upon said spindle, a boss provided upon said disc which engages in a slot formed in the main body of the said axle and is slidable therein; a second disc mounted upon said spindle in such manner that the said axle shall be maintained between the first-mentioned disc and the second disc so as to constitute a shock-absorbing device.

5. An axle for motor vehicles consisting of a profiled member of U or like shape wholly or partially surrounding the cross-piece of the vehicle frame and forming the axle properly so called, an elastic device interposed between the said cross-piece and the vehicle axle above and below the said cross-piece, a spindle secured to the middle of the cross-piece of the vehicle frame and extending in the longitudinal direction of the vehicle, a disc revoluble upon said spindle, a boss provided upon said disc which engages in a slot formed in the main body of the said axle and is slidable therein; a second disc mounted upon said spindle in such manner that the said axle shall be maintained between the first-mentioned disc and the second disc so as to constitute a shock-absorbing device, and two discs secured to the ends of the said cross-piece and constituting a shock-absorbing device at each end of the same.

6. The combination with a vehicle frame having an end cross piece; of an axle member U-shaped in section inclosing said piece and having its web vertical, cushioning devices between said piece and the flanges of said member and means to constrain said member to move vertically with respect to said piece while permitting rotation in the vertical plane.

7. The combination with a vehicle frame having an end cross piece; of an axle member U-shaped in section inclosing said piece and having its web vertical, cushioning devices between said piece and the flanges of said member, means to constrain said member to move vertically with respect to said piece while permitting rotation in the vertical plane, and means to damp the vertical and rotating movements of the member.

8. The combination with a vehicle frame having an end cross piece; of an axle member having a U-shaped section and inclosing said piece, the web of said member being substantially parallel to the outer face of said piece, wheel mounting means secured to the ends of said member beyond the ends of said piece, springs between the two flanges of said member and said piece, a sleeve secured to said piece and projecting through said member, and adjustable friction devices constraining said member to movements in substantially a vertical plane and damping the movements of the member.

In testimony that I claim the foregoing as my invention, I have signed my name hereto.

ETTORE BUGATTI.